United States Patent
Mukaigawa et al.

(10) Patent No.: US 8,185,356 B2
(45) Date of Patent: May 22, 2012

(54) REMOTE MONITORING SYSTEM, TERMINAL MANAGEMENT SERVER AND TERMINAL MANAGEMENT SERVER CONTROL PROGRAM

(75) Inventors: Shinichi Mukaigawa, Kyoto (JP); Tamio Ueda, Kyoto (JP)

(73) Assignee: Omron Corporation, Kyoto (JP)

( * ) Notice: Subject to any disclaimer, the term of this patent is extended or adjusted under 35 U.S.C. 154(b) by 399 days.

(21) Appl. No.: 12/343,254

(22) Filed: Dec. 23, 2008

(65) Prior Publication Data

US 2009/0172477 A1 Jul. 2, 2009

(30) Foreign Application Priority Data

Dec. 28, 2007 (JP) ................................. 2007-339811

(51) Int. Cl.
*G06F 11/00* (2006.01)
*G06F 11/30* (2006.01)

(52) U.S. Cl. ......... 702/188; 702/112; 702/182; 702/183

(58) Field of Classification Search .................. 702/119, 702/121–123, 188, 189, 191, 182–187, 190
See application file for complete search history.

(56) References Cited

U.S. PATENT DOCUMENTS

| | | | |
|---|---|---|---|
| 2002/0035447 A1* | 3/2002 | Takahashi et al. | ............ 702/188 |
| 2003/0144746 A1* | 7/2003 | Hsiung et al. | ................... 700/28 |

FOREIGN PATENT DOCUMENTS

| | | | |
|---|---|---|---|
| JP | 08-97836 (A) | | 4/1996 |
| JP | 11-250376 (A) | | 9/1999 |
| JP | 2000-207465 (A) | | 7/2000 |
| JP | 2001-016266 A | | 1/2001 |
| JP | 2001-325007 A | * | 11/2001 |
| JP | 2001-325007 A | * | 11/2001 |
| JP | 2004-007930 | | 1/2004 |
| JP | 2005-079612 A | | 3/2005 |
| JP | 2005-128952 | | 5/2005 |
| JP | 2006-350827 (A) | | 12/2006 |
| JP | 2007-243487 | | 9/2007 |

* cited by examiner

*Primary Examiner* — Phuong Huynh
(74) *Attorney, Agent, or Firm* — Foley & Lardner LLP (57) ABSTRACT

An insulation monitoring system, functioning as a remote monitoring system, comprises a plurality of insulation monitoring terminals, functioning as remote monitoring terminals, for monitoring facilities and a terminal management server controlling the insulation monitoring terminals. The insulation monitoring terminals and terminal management server are connected each other to bidirectionally transmit and receive information therebetween. The terminal management server includes collective input unit for accepting collectively input configuration information pieces to be set in the insulation monitoring terminals, storage unit for storing the plurality of configuration information pieces input by the collective input unit, and distribution unit for distributing the plurality of configuration information pieces stored in the storage unit to the insulation monitoring terminals respectively associated with the configuration information pieces.

6 Claims, 8 Drawing Sheets

| RECORD ID | TERMINAL ID | SENSOR ID | CHANNEL | MONITORED ITEM | THRESHOLD | ADMINISTRATOR ID | CONTACT INFORMATION | INPUT DATE/TIME | LAST UPDATED DATE/TIME |
|---|---|---|---|---|---|---|---|---|---|
| 001 | T001 | S001 | POWER 1 | LEAKAGE LEVEL | 50mA | P001 | taro@dengen.jp | 2007/12/10 10:00 | - |
| 002 | T001 | S002 | POWER 2 | LEAKAGE LEVEL | 50mA | P001 | taro@dengen.jp | 2007/12/10 10:00 | - |
| 003 | T001 | S003 | LIGHT | INSULATING OIL TEMPERATURE | 180°C | P001 | taro@dengen.jp | 2007/12/10 10:00 | - |
| 004 | T002 | S001 | POWER 1 | POWER FAILURE | 5 sec. | P002 | hanako@dengen.jp | 2007/12/10 10:00 | 2007/12/11 13:30 |
| 005 | T002 | S002 | LIGHT | LEAKAGE LEVEL | 50mA | P002 | hanako@dengen.jp | 2007/12/10 10:00 | - |

FIG.3

| RECORD ID | TERMINAL ID | SENSOR ID | CHANNEL | MONITORED ITEM | THRESHOLD | ADMINISTRATOR ID | CONTACT INFORMATION | DISTRIBUTION DATE/TIME |
|---|---|---|---|---|---|---|---|---|
| 001 | T001 | S001 | POWER 1 | LEAKAGE LEVEL | 50mA | P001 | taro@dengen.jp | 2007/12/10 10:15 |
| 002 | T001 | S002 | POWER 2 | LEAKAGE LEVEL | 50mA | P001 | taro@dengen.jp | 2007/12/10 10:15 |
| 003 | T001 | S003 | LIGHT | INSULATING OIL TEMPERATURE | 180°C | P001 | taro@dengen.jp | 2007/12/10 10:15 |

FIG.4

| RECORD ID | TERMINAL ID | INSTALLATION SITE | SENSOR ID | CHANNEL | MONITORED ITEM | THRESHOLD | ADMINISTRATOR ID | ADMINISTRATOR NAME | CONTACT INFORMATION | DISTRIBUTION DATE/TIME |
|---|---|---|---|---|---|---|---|---|---|---|
| 001 | T001 | ABC PLANT | S001 | POWER 1 | LEAKAGE LEVEL | 50mA | P001 | TARO DENGEN | taro@dengen.jp | 2007/12/10 10:15 |
| 002 | T001 | ABC PLANT | S002 | POWER 2 | LEAKAGE LEVEL | 50mA | P001 | TARO DENGEN | taro@dengen.jp | 2007/12/10 10:15 |
| 003 | T001 | ABC PLANT | S003 | LIGHT | INSULATING OIL TEMPERATURE | 180°C | P001 | TARO DENGEN | taro@dengen.jp | 2007/12/10 10:15 |
| 004 | T002 | XYZ Co. Ltd. | S001 | POWER 1 | POWER FAILURE | 5 sec. | P002 | HANAKO DENGEN | hanako@dengen.jp | - |
| 005 | T002 | XYZ Co. Ltd. | S002 | LIGHT | LEAKAGE LEVEL | 50mA | P002 | HANAKO DENGEN | hanako@dengen.jp | - |

REMOTE MONITORING SYSTEM, TERMINAL MANAGEMENT SERVER AND TERMINAL MANAGEMENT SERVER CONTROL PROGRAM

This application claims priority from Japanese Patent Application 2007-339811, filed on Dec. 28, 2007. The entire content of the aforementioned application is incorporated herein by reference.

BACKGROUND OF THE INVENTION

1. Field of the Invention

This invention relates to a remote monitoring system, a terminal management server and a terminal management server control program, and particularly to a remote monitoring system connected to a plurality of remote monitoring terminals, and a terminal management server and a terminal management server control program used therein.

2. Description of Background Art

An example of conventional monitoring control systems is disclosed in Japanese unexamined patent publication No. 2005-128952. The monitoring control system in the publication includes a central monitoring apparatus that monitors and remotely controls a plurality of radio base stations and subscribers' devices (remote monitoring terminals), the central monitoring apparatus being connected to the radio base stations and subscribers' devices, which are located in a wide range of areas, via a communication network.

The monitoring control system generally has one central monitoring apparatus connected to a plurality of remote monitoring terminals. Since configuration information to be distributed to the remote monitoring terminals varies from terminal to terminal, the more the remote monitoring terminals are connected, the more complicated and troublesome the entry operations of the configuration information become.

SUMMARY OF THE INVENTION

The object of the present invention is to provide a remote monitoring system with simple entry operations of configuration information to be distributed to a plurality of remote monitoring terminals, and a terminal management server and terminal management server control program used in the remote monitoring system.

The remote monitoring system according to the present invention comprises a plurality of remote monitoring terminals each monitoring a facility and a terminal management server controlling the plurality of remote monitoring terminals, the plurality of remote monitoring terminals and the terminal management server being connected to each other to bidirectionally transmit and receive information therebetween. The terminal management server includes collective input unit for accepting a plurality of collectively input configuration information pieces to be set in each of the remote monitoring terminals, storage unit for storing the plurality of configuration information pieces input by the collective input unit, and distribution unit for distributing the configuration information pieces stored in the storage unit to the remote monitoring terminals respectively associated with the configuration information pieces. The collective input of the plurality of configuration information pieces can simplify the entry operations of the configuration information even if a large number of remote monitoring terminals are to be installed.

Preferably, each of the remote monitoring terminals includes status notification unit for transmitting a receive-ready notification to the terminal management server when the remote monitoring terminal has prepared itself to receive the configuration information. The storage unit stores the configuration information pieces so as to be recognizable whether the configuration information pieces have been completely delivered or not to the associated remote monitoring terminals. When the terminal management server receives a receive-ready notification from a remote monitoring terminal that has not accepted configuration information, the distribution unit distributes the configuration information to the remote monitoring terminal.

According to the structure, the configuration information pieces to be distributed to the plurality of remote monitoring terminals are collectively input in advance and can be delivered to each of the remote monitoring terminals in the order in which the remote monitoring terminal has prepared itself. This significantly decreases the work load on administrators.

Preferably, the terminal management server further includes display unit for displaying the information stored in the storage unit. More preferably, the terminal management server further includes edit unit for editing the configuration information displayed by the display unit. This visualizes the configuration information registered in the terminal management server. Accordingly, a third party can check and correct the configuration information, thereby effectively preventing malfunction of the remote monitoring system caused by inputting errors.

Preferably, the configuration information includes a threshold of a monitored item of a facility. Each of the remote monitoring terminals further includes detection unit for detecting abnormalities in the facility and abnormality notification unit for transmitting an abnormality notification to the terminal management server when the detection result by the detection unit exceeds the threshold.

More preferably, the configuration information includes contact information to which the information concerning the remote monitoring terminal is reported. The terminal management server further includes report unit for reporting the abnormalities in the facility to the contact information in response to the abnormality notification from the remote monitoring terminal. This structure allows the administrators to grasp the situation of the facilities without visiting the installation site to check the facilities, thereby significantly reducing the cost involved in periodic maintenance.

In an embodiment of the present invention, the collective input unit accepts CSV (Comma Separated Values) data containing the plurality of configuration information pieces.

Preferably, the terminal management server and the plurality of remote monitoring terminals are interconnected via a radio communication network. This eliminates wiring between the network and remote monitoring terminals, thereby simplifying operations for installing new remote monitoring terminals. An applicable radio communication network is FOMA (registered trademark) or the like.

A terminal management server according to the present invention is connected to a plurality of remote monitoring terminals each for monitoring a facility to bidirectionally transmit and receive information. The terminal management server includes collective input unit for accepting a plurality of collectively input configuration information pieces to be set in the remote monitoring terminals, storage unit for storing the configuration information pieces input by the collective input unit, and distribution unit for distributing the configuration information pieces stored in the storage unit to the remote monitoring terminals respectively associated with the configuration information pieces.

The terminal management server control program according to the present invention enables a computer to operate as the above-described terminal management server.

DESCRIPTION OF THE PREFERRED EMBODIMENTS

Figure 1:
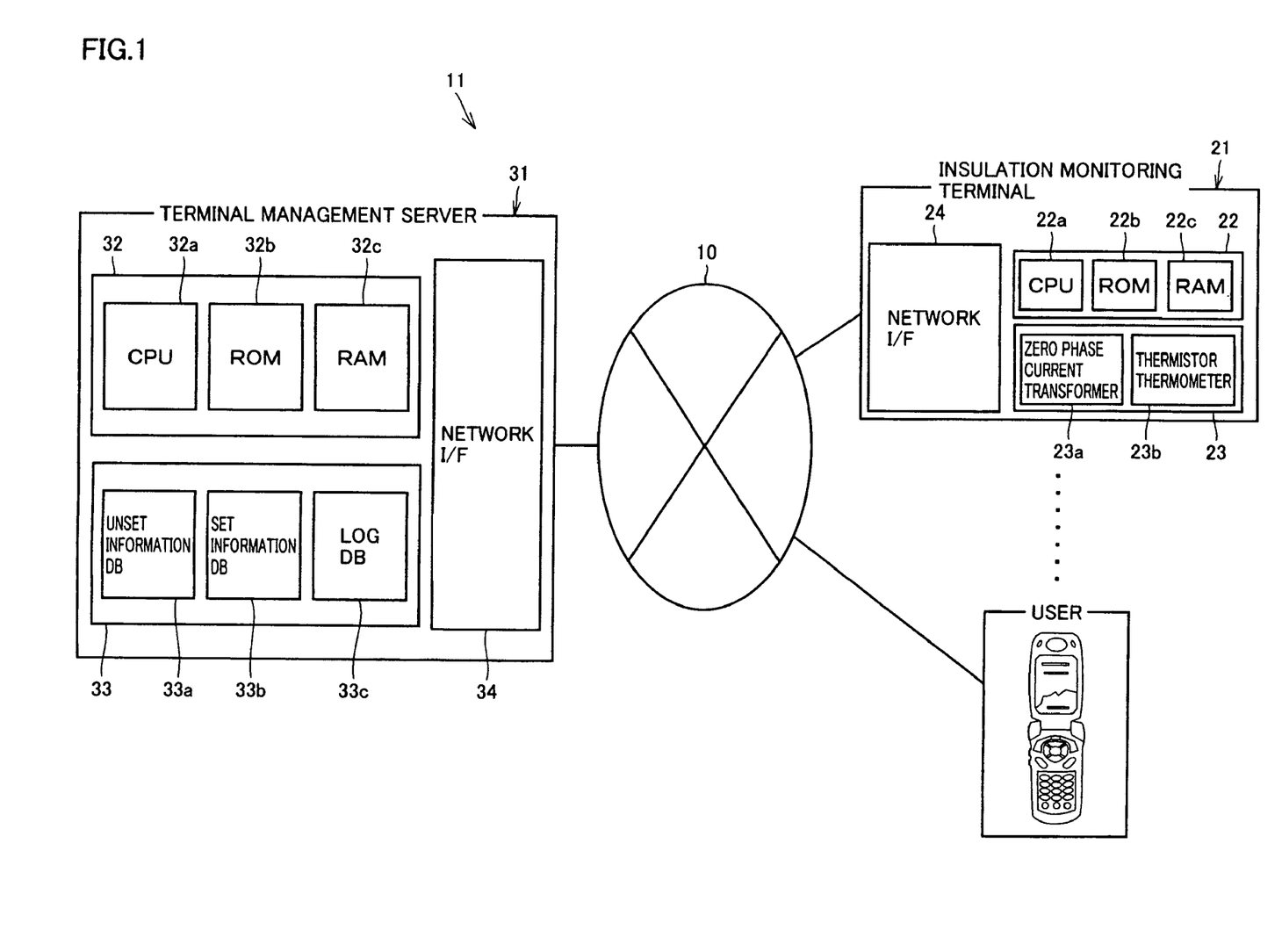
FIG. 1 is a block diagram showing a configuration of the insulation monitoring system according to an embodiment of the present invention.
Figure 2:
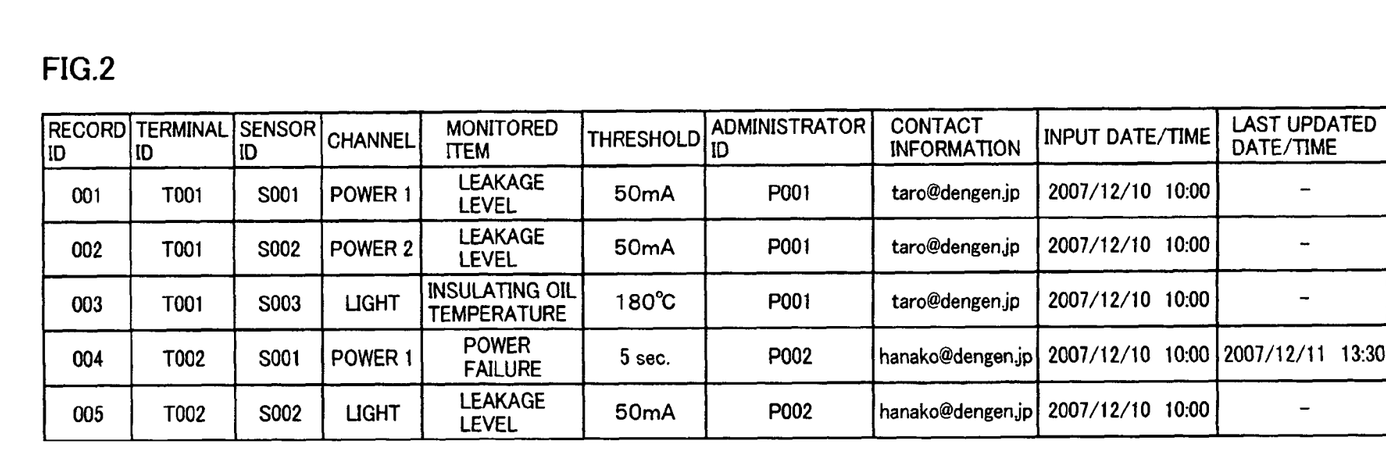
FIG. 2 illustrates a data structure of an unset information DB (Database).
Figure 3:
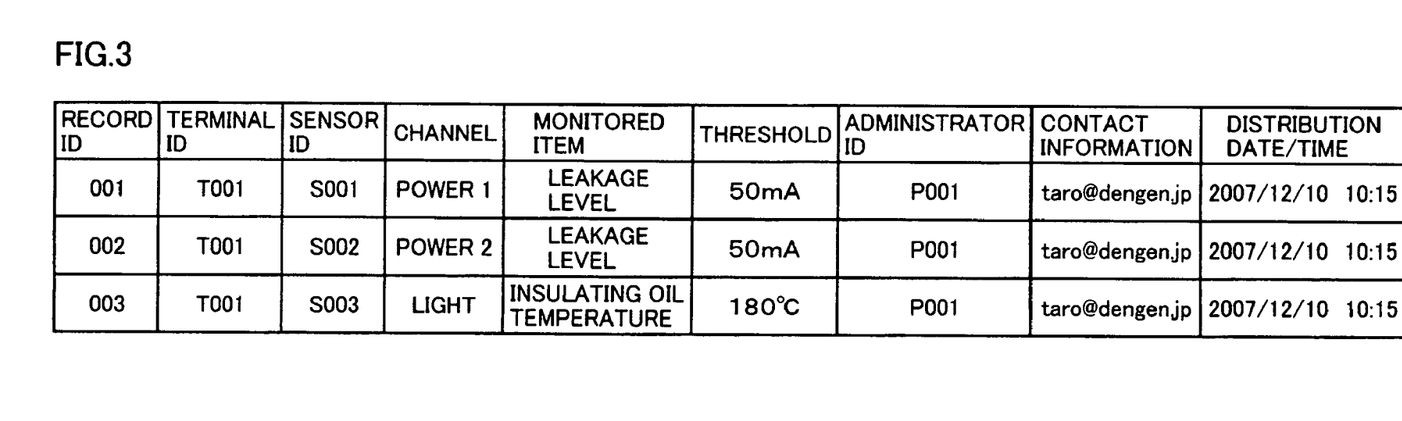
FIG. 3 illustrates a data structure of a set information DB.
Figure 4:
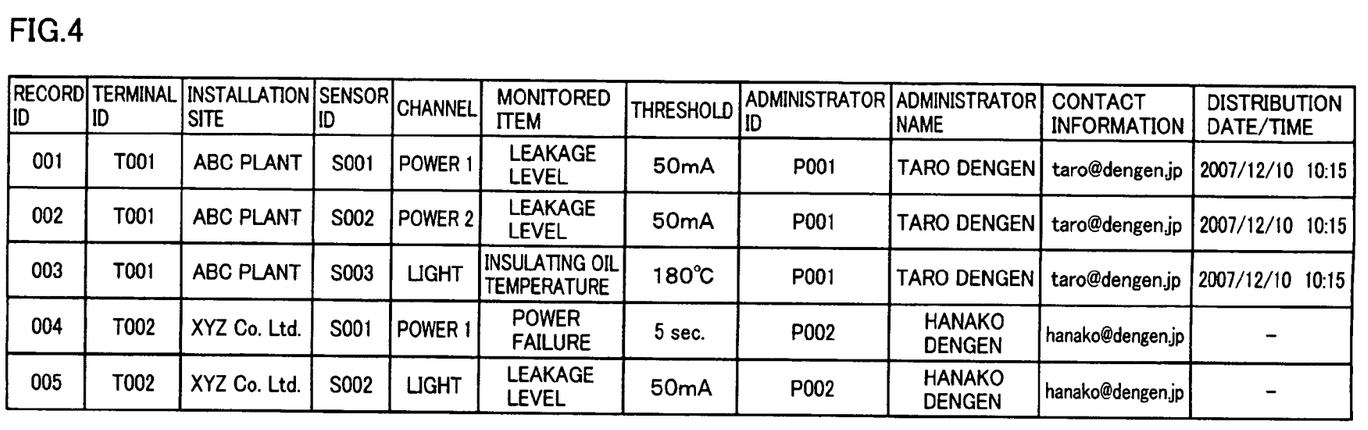
FIG. 4 illustrates an exemplary representation of the configuration information.

With reference to FIGS. 1 to 8, descriptions will be made about an insulation monitoring system 11 as an example of the remote monitoring system according to an embodiment of the present invention. FIG. 1 is a block diagram showing the configuration of the insulation monitoring system 11; FIG. 2 illustrates a data structure of an unset information DB 33a; FIG. 3 illustrates a data structure of a set information DB 33b; FIG. 4 is an exemplary representation of the configuration information; and FIGS. 5 to 8 are flow charts illustrating the operations of the insulation monitoring system 11.

Referring to FIG. 1, the insulation monitoring system 11 includes a plurality of insulation monitoring terminals 21 functioning as remote monitoring terminals and a terminal management server 31 connected to the plurality of insulation monitoring terminals 21 via a network 10. The insulation monitoring terminals 21 and the terminal management server 31 can bidirectionally send and receive information therebetween. Specifically, the insulation monitoring terminals 21 provide a receive-ready notification, abnormality notification and other notifications to the terminal management server 31. On the other hand, the terminal management server 31 provides configuration information and other information to the insulation monitoring terminals 21.

The insulation monitoring terminal 21 includes a controller 22, a detector 23 functioning as detecting unit and a network I/F (interface) 24, and monitors a cubicle or the like (hereinafter referred to as "power unit") installed in a building. The "cubicle" is the abbreviated name for "cubicle type high voltage power receiving unit" which is a power receiving unit accommodating a full set of apparatuses, such as an apparatus for receiving high voltage power from an electrical power supplier, a transformer, a capacitor and a safety device, in a metal box.

The controller 22 includes a CPU (Central Processing Unit) 22a, a ROM (Read Only Memory) 22b in which programs and so on are stored, a RAM (Random Access Memory) 22c, which is a temporal storage area, and controls the entire insulation monitoring terminal 21. The CPU 22a operates as status notification unit and abnormality notification unit by itself or with the network I/F 24.

The status notification unit is to send a receive-ready notification to the terminal management server 31 when the insulation monitoring terminal 21 has entered a state of readiness for receiving configuration information. The state of "readiness for receiving" is, for example, a state where the insulation monitoring terminal 21 is connected to a communication line. The abnormality notification unit transmits an abnormality notification to the terminal management server 31 when the detector 23 detects that an abnormal event has occurred in the target power unit.

The detector 23 detects abnormal behavior in the target power unit and includes a zero phase current transformer (ZCT) 23a and a thermistor thermometer 23b for example. Specifically, the zero phase current transformer 23a and thermistor thermometer 23b measure the leakage current and the transformer temperature (not shown), respectively. The insulation monitoring terminal 21 can include a plurality of detectors 23 to monitor a plurality of channels simultaneously.

The network I/F 24 connected to the network 10 sends and receives data with the terminal management server 31. In this embodiment, the network 10 is desirably a radio communication network such as a FOMA (Freedom Of Mobile multimedia Access) network. Use of the radio communication network eliminates wiring between the network 10 and insulation monitoring terminals 21, which simplify installation operations for newly added insulation monitoring terminals 21.

The terminal management server 31 includes a controller 32, a storage device 33, a network I/F 34, and is connected to the network 10 to control the insulation monitoring terminals 21. One terminal management server 31 can control a plurality of insulation monitoring terminals 21.

The controller 32 includes a CPU 32a, a ROM 32b in which programs and so on are stored, and a RAM 32c, which is a temporal storage area, and controls the entire terminal management server 31. The CPU 32a operates, by itself or with the network I/F 34, as collective input unit, distribution unit, display unit, edit unit and report unit.

The collective input unit accepts a plurality of collectively input configuration information pieces. The input configuration information pieces are registered in an unset information DB 33a. One of the specific methods for collectively inputting the information can be realized by importing a CSV file to which the plurality of configuration information pieces are saved.

The distribution unit distributes the configuration information registered in the unset information DB 33a to the insulation monitoring terminals 21 associated with the configuration information. The distribution operation of the configuration information is classified into a configuration-information distribution process (FIG. 5) that is performed at the point when the configuration information is registered in the unset information DB 33a, and a configuration-information redistribution process (FIG. 6) that is performed at the point when the terminal management server 31 receives a receive-ready notification from the insulation monitoring terminal 21.

The display unit displays the configuration information held by the terminal management server 31 on the screen at the user's terminal. The display unit can also display only configuration information retrieved with a search criterion: for example, only the configuration information that has not been completely delivered; or only the configuration information relating to a specific administrator.

The edit unit accepts changes in the configuration information displayed by the display unit. Note that the configuration information registered in the set information DB 33b is desirably write-protected so as to prevent a mismatch with the configuration information held by the insulation monitoring terminals 21.

The report unit notifies the administrator of the occurrence of an abnormal event upon receiving an abnormality notification from an insulation monitoring terminal 21. Specifically, the report unit sends an email to the mail address (contact information) listed in the configuration information.

The storage device 33 includes the unset information DB 33a and the set information DB 33b, both functioning as storage unit for storing the configuration information, and a log DB 33c. The unset information DB 33a holds configuration information that has not yet been distributed to the insulation monitoring terminals 21, while the set information DB 33b holds configuration information that has already been distributed to the insulation monitoring terminals 21. With this structure, distribution of the configuration information to the associated insulation monitoring terminal 21 can be judged depending on whether the configuration information is in the unset information DB 33a (incomplete distribution) or in the set information DB 33b (complete distribution). The log DB 33c records a job log of the terminal management server 31, such as input, distribution and changes of the configuration information, and receipt and report of the abnormality notification.

The network I/F 34 connected to the network 10 is used to send and receive data between the insulation monitoring terminal 21 and a user. The user accesses the terminal management server 31 through his/her personal computer (PC), cellular phone and other kinds of communication equipment.

With reference to FIGS. 2 and 3, a description will be made about the information stored in the unset information DB 33a and set information DB 33b (collectively referred to as "configuration information DB"). First, FIG. 2 shows that the unset information DB 33a includes a record ID field for identifying records, a configuration information field, an input date and time field and a last updated date and time field.

The configuration information includes a terminal ID field for identifying the insulation monitoring terminals 21, a sensor ID field for identifying the detector 23 in the insulation monitoring terminal 21, a channel field for indicating an object to be monitored, a monitored item field, a threshold field, an administrator ID field for indicating the administrator of an insulation monitoring terminal 21 and an administrator contact information field.

The date and time at which the configuration information was input into the terminal management server 31 is written in the input date and time field. The most recent date and time at which the configuration information was updated is written in the last updated date and time field. It should be noted that blank cells in the latest updated date and time field imply that the configuration information has not been changed at all.

With reference to FIG. 3, the set information DB 33b includes a record ID field, a configuration information field and a distribution date and time field for indicating the date and time at which the configuration information was distributed to the associated insulation monitoring terminal 21. The concrete fields in the configuration information field are common with those in the unset information DB 33a shown in FIG. 2, and therefore their explanations will not be reiterated.

With reference to FIGS. 2 to 8, the operations of the insulation monitoring system 11 having the above-described structure will be described.

Figure 5:
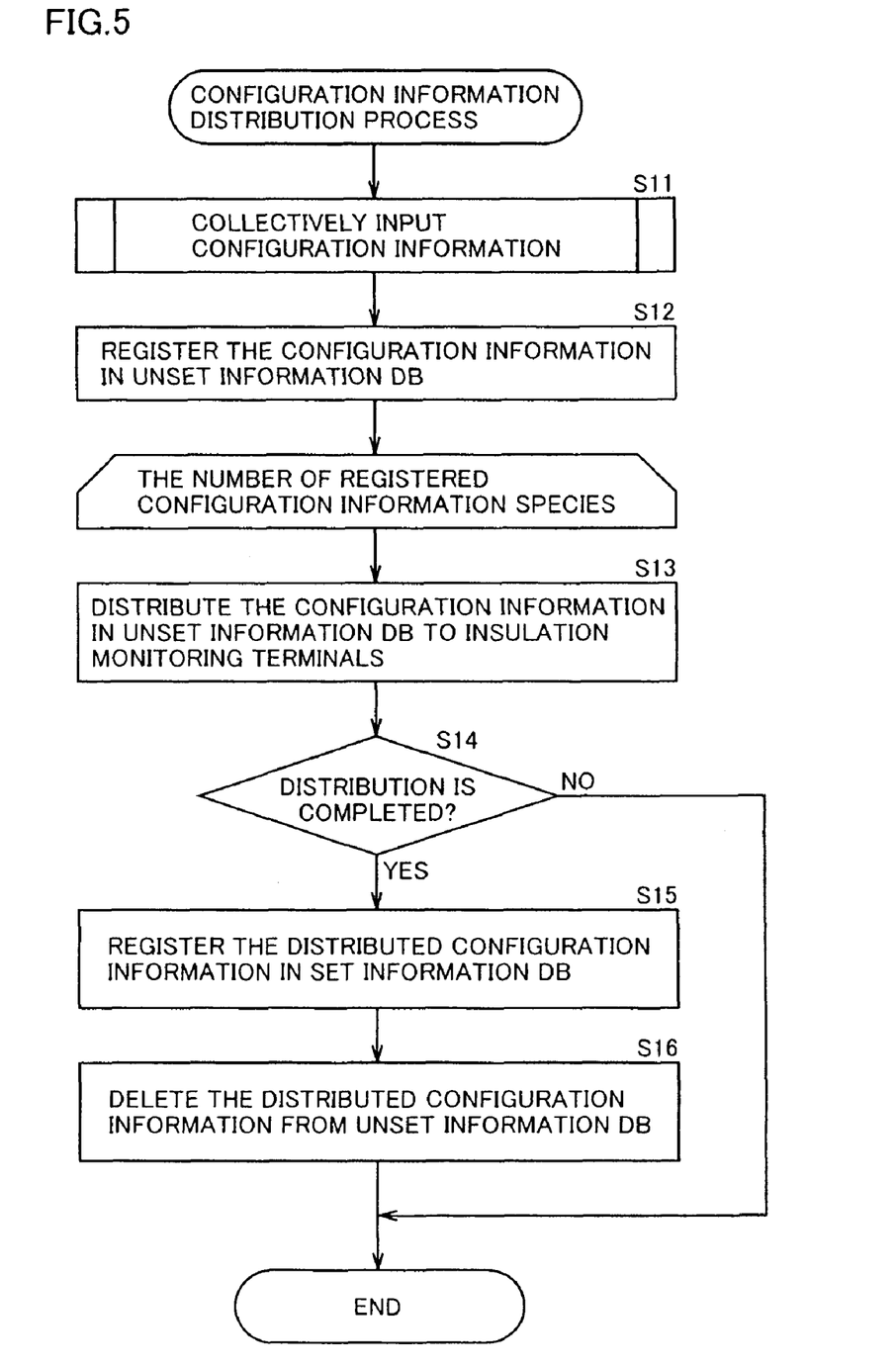
FIG. 5 is a flow chart showing a distribution process of the configuration information.

FIG. 5 is a flow chart showing a process for distributing the configuration information. In step S11 of FIG. 5, the terminal management server 31 accepts configuration information collectively input by a user. Specifically, the user accesses the terminal management server 31 via the network 10 to upload a CSV file holding a plurality of configuration information pieces. Alternatively, the user can have the terminal management server 31 directly read a recording medium storing the CSV file.

In step S12, the terminal management server 31 makes entries of the configuration information pieces, which were input at once, with the input date and time to the unset information DB 33a. In this embodiment, five records (record ID "001 to 005") shown in FIG. 2 are assumed to have been entered. The above steps (S11 to S12) are controlled by the CPU 32a operating as collective input unit.

In step S13, the terminal management server 31 distributes the configuration information pieces registered in the unset information DB 33a to the insulation monitoring terminals 21 respectively associated with the configuration information pieces. Each of the insulation monitoring terminal 21 stores the received configuration information into the RAM 22c.

Since the configuration information varies according to the channel, a plurality of configuration information records are delivered to an insulation monitoring terminal 21. In this embodiment, three records, i.e., record ID "001 to 003" are delivered to the insulation monitoring terminal 21 having terminal ID "T001" at once.

In a case where the configuration information has been completely distributed (YES in step S14), the terminal management server 31 makes entries of the distributed configuration information (record ID "001 to 003"), as shown in FIG. 3, with the distribution date and time into the set information DB 33b in step S15, while deleting the distributed configuration information records in the unset information DB 33a in step S16. On the contrary, in a case where the configuration information could not be distributed (NO in step S14), the operations in step S15 and step S16 are skipped.

The operations (S13 to S16) are executed for all configuration information pieces registered in the unset information DB. In addition, the steps (S13 to S16) are controlled by the CPU 32a operating as distribution unit. The above-described method realizes simplified entry operations of the configuration information, even if there are a large number of insulation monitoring terminals 21 to be installed.

Figure 6:
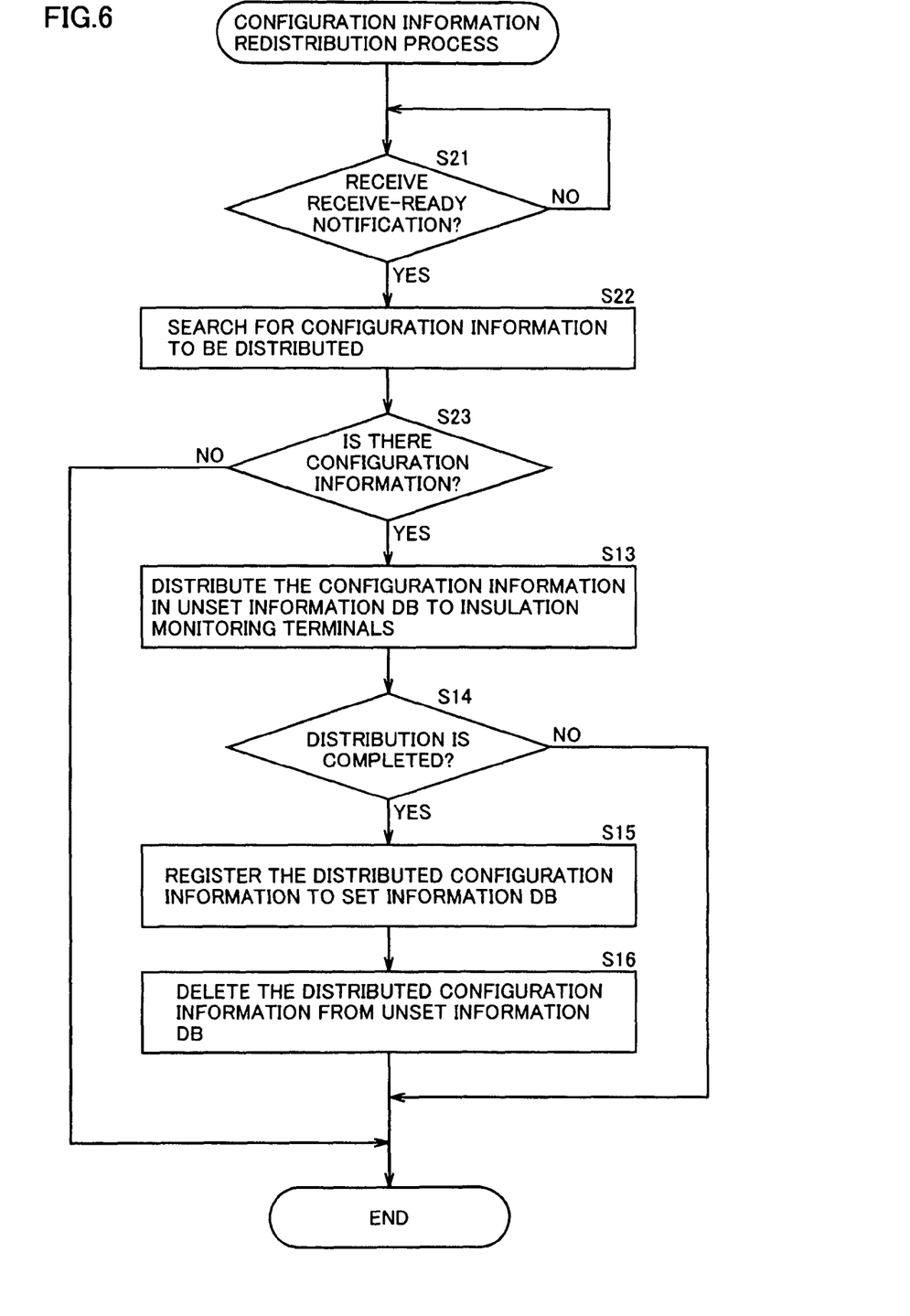
FIG. 6 is a flow chart showing a redistribution process of the configuration information.

FIG. 6 is a flow chart showing a process for redistributing the configuration information. In step S21 of FIG. 6, the terminal management server 31 monitors the arrival of a receive-ready notification from the insulation monitoring terminals 21 connected thereto.

The terminal management server 31 that has received the receive-ready notification (YES in step S21) starts searching the unset information DB 33a for the configuration information to be delivered to the insulation monitoring terminal 21, which is a transmitter of the receive-ready notification, in step S22. If the configuration information to be delivered does not exist in the unset information DB 33a (NO in step S23), the subsequent steps (S13 to S16) will be skipped to terminate the process and again start monitoring the arrival of the receive-ready notification.

On the contrary, if there is configuration information to be delivered in the unset information DB 33a (YES in step S23), the configuration information will be delivered to the insulation monitoring terminal 21 (S13 to S16). The description regarding steps S13 to S16 has been already made with reference to FIG. 2 and therefore is not reiterated now.

If the assumption is made that in the distribution process of the configuration information described with FIG. 5, the insulation monitoring terminal 21 having terminal ID "T002" is not ready yet and has not received its configuration information, two records, i.e., record ID "004 and 005" should still be in the unset information DB 33a. Then, when receiving the receive-ready notification from the insulation monitoring terminal 21 having terminal ID "T002", the terminal management server 31 delivers the two records having record ID "004 and 005" to the insulation monitoring terminal 21.

By the way, installation of a plurality of insulation monitoring terminals 21 creates a certain amount of time differences among the insulation monitoring terminals 21 to completely prepare themselves. Inputting the configuration information after all of the insulation monitoring terminals 21 are prepared is inefficient; however, inputting the configuration information into respective insulation monitoring terminals 21 in the order in which the preparation is made increases administrator work load.

To solve this problem, the configuration information to be distributed to the plurality of insulation monitoring terminals 21 is input collectively in advance (S11 in FIG. 5), and the input configuration information is delivered to the insulation monitoring terminals 21 when they get ready, in other words, when the terminal management server 31 receives the receive-ready notification, thereby significantly reducing the work burdens on the administrator.

Figure 7:
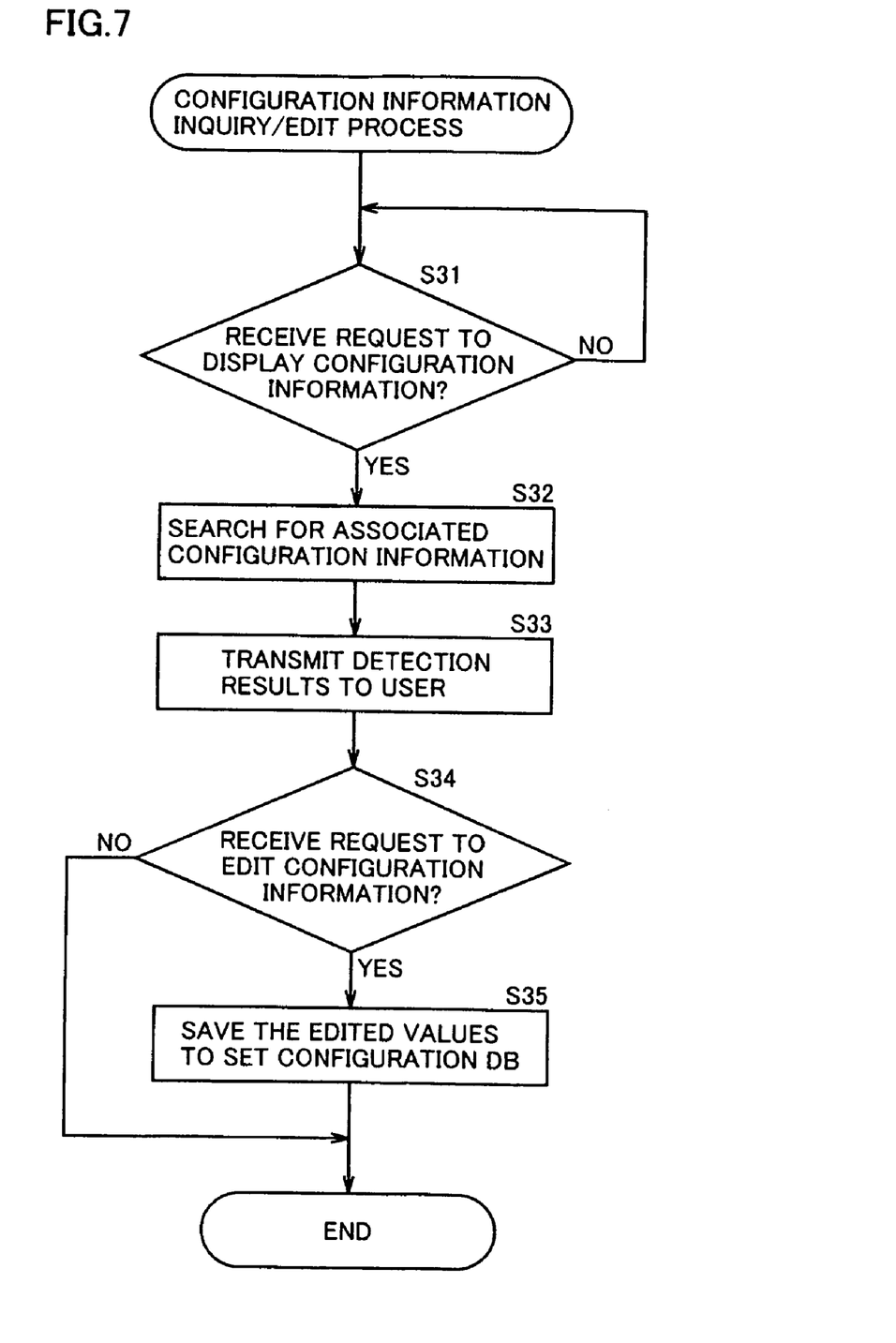
FIG. 7 is a flow chart showing an inquiry/edit process of the configuration information.

FIG. 7 is a flow chart showing a process for inquiring and editing the configuration information. In step S31 of FIG. 7, the terminal management server 31 monitors the arrival of a request to display the configuration information from the user.

Upon receiving the display request (YES in step S31), the terminal management server 31 starts searching the configuration information DB for the configuration information associated with the display request in step S32. The search criteria specified by the user can be anything.

In step S33, the terminal management server 31 transmits the search results to the user. The steps (S31 to S33) are controlled by the CPU 32a operating as display unit. The exemplary representation of the search results is shown in FIG. 4.

With reference to FIG. 4, the displayed fields in this embodiment include, in addition to the configuration information, a record ID field, a terminal installation site field, an administrator's name field, and a distribution date and time field. The installation site of the terminal is retrieved from records associated with the terminal ID in a terminal DB (not shown). Similarly, the administrator's name is retrieved from records associated with the administrator ID in an administrator DB (not shown). The records having values in the distribution date and time field imply that the configuration information has been already delivered, while the records without values in the distribution date and time field imply that the configuration information has still been waiting to be delivered.

This data structure can visualize the configuration information registered in the terminal management server 31 and consequently allows a third party to check the configuration information. Simultaneous execution of an edit process to the configuration information, as will be described later, can effectively prevent the insulation monitoring system 11 from having malfunctions caused by an inputting error.

In step S34, the terminal management server 31 monitors the arrival of a request to edit the configuration information from the user. After receiving the edit request (YES in step S34), the terminal management server 31 saves the edited configuration information to the unset information DB 33a and terminates the process.

A specific editing method may be overwriting the preset values in the configuration information or making a copy from the contents of the other configuration information. The "edit" includes deletion of the configuration information. However, the configuration information registered in the set information DB 33b is not editable in order to prevent it from being mismatched with the configuration information held by the insulation monitoring terminals 21.

On the contrary, if having not received the edit request after a lapse of a predetermined monitoring time (NO in step S34), the terminal management server 31 terminates the process without executing the subsequent step (S35). The steps (S34 to S35) are controlled by the CPU 32a operating as edit unit.

Figure 8:
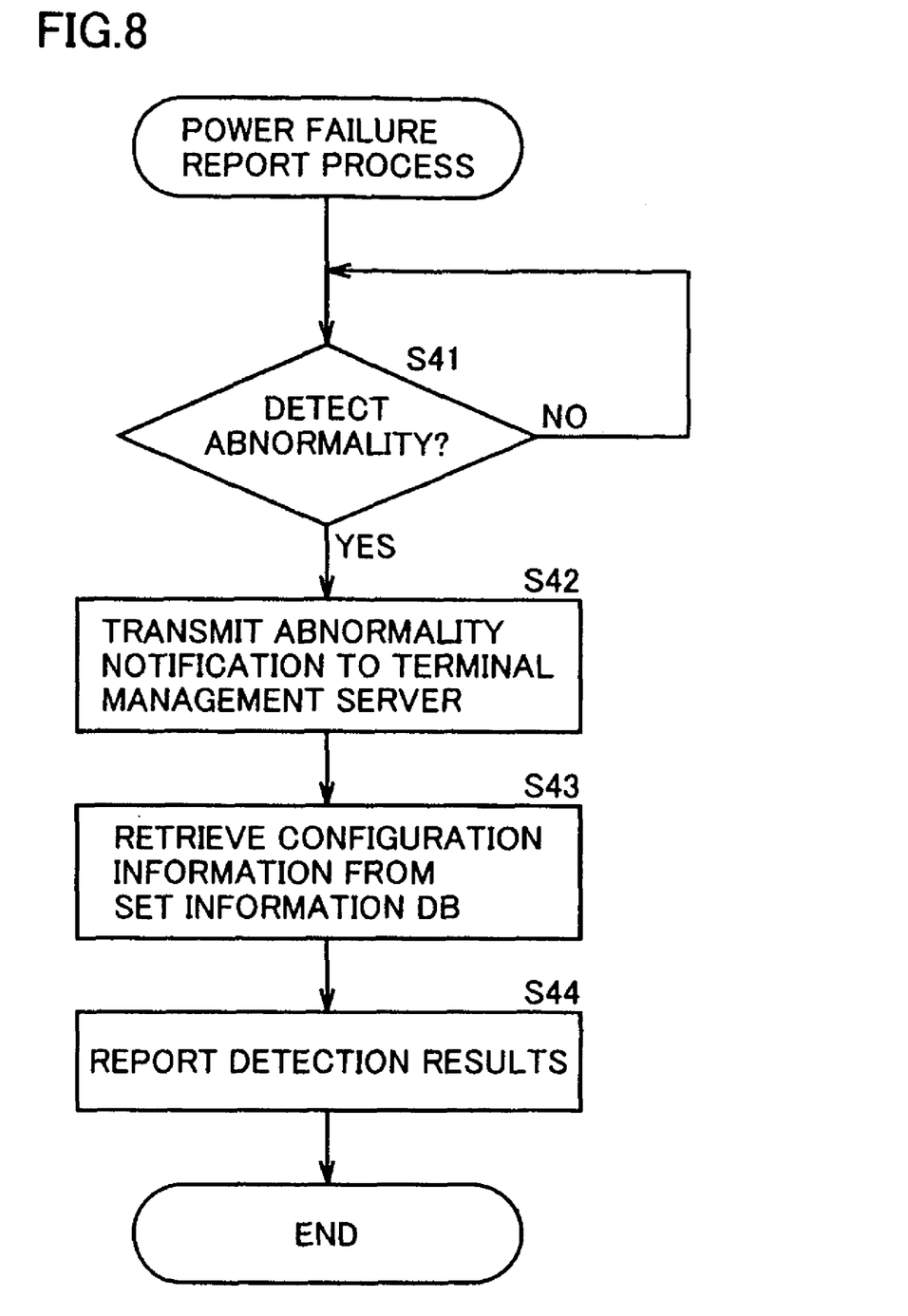
FIG. 8 is a flow chart showing a process for reporting a power abnormality.

FIG. 8 is a flow chart showing a process for reporting a power abnormality. In step S41 shown in FIG. 8, an insulation monitoring terminal 21 monitors whether a target power unit has problems. Specifically, the insulation monitoring terminal 21 compares the results detected by the detector 23 and the threshold in the configuration information and determines the power unit to be abnormal when the detection results exceeds the threshold.

When detecting an abnormal behavior (YES in step S41), the insulation monitoring terminal 21 transmits an abnormality notification to the terminal management server 31 in step S42. The steps (S41 to S42) are controlled by the CPU 22a operating as abnormality notification unit.

In step S43, the terminal management server 31 retrieves the configuration information that has been delivered to the insulation monitoring terminal 21, which is a transmitter of the abnormality notification, from the set information DB 33b. Then, in step S44, the terminal management server 31 reports the detection results to the mail address (contact information) registered in the configuration information. The steps (S43 to S44) are controlled by the CPU 32a operating as report unit.

According to the above-described method, the administrator can grasp the situation of the power unit without visiting the installation site to check the power unit, resulting in significant cost reduction of periodic maintenance. The above-described processes are available not only to alarm the abnormal behavior but also to regularly report the power unit status to the administrator.

It is desirable to record the processes executed by the terminal management server 31 in the log DB 33c. This helps to diagnose the cause of troubles. The processes stored in the log DB 33c can be configured to be displayed through the display unit.

Although the terminal management server 31 according to the above-described embodiment comprises the collective input unit for accepting a collectively input plurality of configuration information pieces at once as an example, the terminal management server 31 can further comprise general input unit for accepting the configuration information pieces one by one.

Although the above-described embodiment employs the configuration information DB, functioning as storage unit, being indexed by "record ID", the present invention is not limited thereto but can adopt any type of data structure. Specifically, a queue is available as a data structure. For example, if it is assumed that the start-up dates of newly-installed insulation monitoring terminals 21 are preset, their configuration information can be stored in a queue in chronological order.

Although the above-described embodiment employs a zero phase current transformer 23a and thermistor thermometer 23b to constitute a detector 23 as an example, the present invention is not limited thereto but can adopt any detection devices.

For example, the thermistor thermometer 23b can be used to measure temperatures of the inside of the power unit in addition to the transformer. Also, a pulse converter can be adopted to measure demand values (kW), a polymer resistive sensor can be used to measure humidity (% RH), and a flow meter can be adopted to measure gas flow rate ($m^3$) or water flow rate ($m^3$). Furthermore, the embodiment can adopt an ammeter to measure current values (A) and a voltmeter to measure voltage values (V) further to calculate the amount of electric power (kWh) with the measured values.

It is desirable to provide the input unit for accepting the configuration information to only the terminal management server 31 but not to the insulation monitoring terminals 21 so that the insulating monitoring terminals 21 are never directly supplied with the configuration information. This prevents a mismatch between the configuration information in the insulation monitoring terminals 21 and the configuration information held by the terminal management server 31.

Although the description has been made about the insulation monitoring system as an embodiment of a remote monitoring system, the present invention is not limited thereto but is applicable to any types of remote monitoring systems comprising a plurality of remote monitoring terminals each monitoring a specific facility and a terminal management server controlling the remote monitoring terminals. Such a remote monitoring system can be used to monitor energy, power demand, tank levels, manhole pumps and so on.

Furthermore, although the terminal management server 31 used in the embodiment is a dedicated apparatus as an example, the present invention is not limited thereto but a general-purpose computer can be used with a program installed to execute the same process as executed by the terminal management server 31. In this case, the program can be supplied in the form of a recording medium such as a CD and DVD, or can be downloaded through a network.

The foregoing has described the embodiment of the present invention by referring to the drawings. However, the invention should not be limited to the illustrated embodiment. It should be appreciated that various modifications and changes can be made to the illustrated embodiment within the scope of the appended claims and their equivalents.

What is claimed is:

1. A remote monitoring system comprising:
   a first plurality of remote monitoring terminals each monitoring a facility and a terminal management server controlling said first plurality of remote monitoring terminals, said plurality of remote monitoring terminals and said terminal management server being connected to each other to bidirectionally transmit and receive information therebetween and,
   said terminal management server comprising:
      a collective input unit configured to accept an input of a first plurality of configuration information pieces to be set in each of said remote monitoring terminals, with the configuration pieces comprising information on the plurality of the remote monitoring terminals, and said configuration information is different for each of said plurality of remote monitoring terminals;
      a storage unit configured to store said configuration information pieces input by said collective input unit; and
      a distribution unit configured to distribute said configuration information pieces stored in said storage unit to the remote monitoring terminals respectively associated with the configuration information pieces,
   wherein
   each of said remote monitoring terminals comprises a status notification unit configured to transmit a receive-ready notification to said terminal management server when said remote monitoring terminal has prepared itself to receive said configuration information pieces,
   and wherein said storage unit is configured to store said configuration information pieces to be recognizable whether the configuration information pieces have been completely delivered or not to said associated remote monitoring terminals, and
   wherein said terminal management server is configured so that when said terminal management server receives a receive-ready notification from a remote monitoring terminal that has not accepted configuration information pieces, said distribution unit distributes the configuration information pieces to said remote monitoring terminal; and
   wherein said storage unit includes an unset information database configured to register unset configuration information input to said collective input unit and a set information database provided separately from said unset information database configured to store distributed configuration information, and
   said distribution unit includes a set information distribution unit configured to distribute configuration information to corresponding remote monitoring terminals, and when configuration information is not distributed, the unset information database is configured to not remove from said unset information database the configuration information not distributed, and when configuration information is distributed, the unset information database is configured to remove the distributed configuration information from said unset information database and the set information database is configured to register the same distributed configuration information in said set information database, and said distribution unit further includes a set information redistributing unit configured to redistribute configuration information to a corresponding remote monitoring terminal when said distribution unit receives from said corresponding remote monitoring terminal a receive-ready notification.

2. A remote monitoring system comprising:
   a first plurality of remote monitoring terminals each monitoring a facility and a terminal management server controlling said first plurality of remote monitoring terminals, said plurality of remote monitoring terminals and said terminal management server being connected to each other to bidirectionally transmit and receive information therebetween and,
   said terminal management server comprising:
      a collective input unit configured to accept an input of a first plurality of configuration information pieces to be set in each of said remote monitoring terminals, with the configuration pieces comprising information on the plurality of the remote monitoring terminals, and said configuration information is different for each of said plurality of remote monitoring terminals;
      a storage unit configured to store said configuration information pieces input by said collective input unit; and
      a distribution unit configured to distribute said configuration information pieces stored in said storage unit to the remote monitoring terminals respectively associated with the configuration information pieces,
      wherein said storage unit includes an unset information database configured to register unset configuration information input to said collective input unit and a set information database provided separately from said unset information database configured to store distributed configuration set information, and said distribution unit includes a set information distribution unit configured to distribute configuration information to corresponding remote monitoring terminals, and when configuration information is not distributed, the unset information database is configured to not remove from said unset information database the configuration information not distributed, and when configuration information is distributed, the unset information database is configured to remove the distributed configuration information from said unset information database and the set information database is configured to register the same distributed configuration information in said set information database, and said distribution unit further includes a set information redistributing unit configured to redistribute configuration information to a corresponding remote monitoring terminal when said distribution unit receives from said corresponding remote monitoring terminal a receive-ready notification, and wherein at least a second plurality of said configuration information pieces includes a threshold of a monitored item of a facility, and at least a second plurality of said remote monitoring terminals associated with said second plurality of configuration information pieces comprise:
  a detection unit for detecting abnormalities in the facility; and
  an abnormality notification unit configured to transmit an abnormality notification to said terminal management server when a detection result by said detection unit exceeds said threshold.

3. The remote monitoring system according to claim 2, wherein
said configuration information pieces include contact information to which the information concerning said remote monitoring terminal is reported, and
said terminal management server further comprises a report unit configured to report abnormalities in the facility to said contact information in response to said abnormality notification from said remote monitoring terminal.

4. A remote monitoring system comprising:
a plurality of remote monitoring terminals each monitoring a facility and a terminal management server controlling said plurality of remote monitoring terminals, said plurality of remote monitoring terminals and said terminal management server being connected to each other to bidirectionally transmit and receive information therebetween and,
said terminal management server comprising;
  a collective input unit configured to accept a plurality of collectively input configuration information pieces to be set in each of said remote monitoring terminals, with the configuration pieces comprising information on the plurality of the remote monitoring terminals, and said configuration information is different for each of said plurality of remote monitoring terminals;
  a storage unit configured to store said configuration information pieces input by said collective input unit; and
  a distribution unit configured to distribute said configuration information pieces stored in said storage unit to the remote monitoring terminals respectively associated with the configuration information pieces,
wherein:
  each of said remote monitoring terminals includes a status notification unit for transmitting a receive-ready notification to said terminal management server when said remote monitoring terminal has prepared itself to receive said configuration information pieces,
  said storage unit is configured to store said configuration information pieces to be recognizable whether the configuration information pieces have been completely delivered or not to said associated remote monitoring terminals, and
  said terminal management server is configured so that when said terminal management server receives a receive-ready notification from a remote monitoring terminal that has not accepted configuration information pieces, said distribution unit distributes the configuration information pieces to said remote monitoring terminal, and
  wherein said storage unit includes an unset information database configured to register unset configuration information input to said collective input unit and a set information database provided separately from said unset information database configured to store distributed configuration information, and
  said distribution unit includes a set information distribution unit configured to distribute configuration information to corresponding remote monitoring terminals, and when configuration information is not distributed, the unset information database is configured to not remove from said unset information database the configuration information not distributed, and when configuration information is distributed, the unset information database is configured to remove the distributed configuration information from said unset information database and the set information database is configured to register the same distributed configuration information in said set information database, and said distribution unit further includes a set information redistributing unit configured to redistribute configuration information to a corresponding remote monitoring terminal when said distribution unit receives from said corresponding remote monitoring terminal a receive-ready notification.

5. A remote monitoring system comprising:
a plurality of remote monitoring terminals each monitoring a facility and a terminal management server controlling said plurality of remote monitoring terminals, said plurality of remote monitoring terminals and said terminal management server being connected to each other to bidirectionally transmit and receive information therebetween and,
said terminal management server comprising;
  a collective input unit configured to accept a first plurality of collectively input configuration information pieces to be set in each of said remote monitoring terminals, with the configuration pieces comprising information on the plurality of the remote monitoring terminals and said configuration information is different for each of said plurality of remote monitoring terminals;
  a storage unit configured to store said configuration information pieces input by said collective input unit; and
  a distribution unit configured to distribute said configuration information pieces stored in said storage unit to the remote monitoring terminals respectively associated with the configuration information pieces, and
  wherein said storage unit includes an unset information database configured to register unset configuration information input to said collective input unit and a set information database provided separately from said unset information database configured to store distributed configuration information, and said distribution unit includes a set information distribution unit configured to distribute configuration information to corresponding remote monitoring terminals, and when configuration information is not distributed, the unset information database is configured to not remove from said unset information database the configuration information not distributed, and when configuration information is distributed, the unset information database is configured to remove the distributed configuration information from said unset information database and the set information database is configured to register the same distributed configuration information in said set information database, and said distribution unit further includes a set information redistributing unit configured to redistribute configuration information to a corresponding remote monitoring terminal when said distribution unit receives from said corresponding remote monitoring terminal a receive-ready notification, wherein at least a second plurality of the configuration information pieces includes a threshold of a monitored item of a facility, and each of said remote monitoring terminals further including:

a detection unit configured to detect abnormalities in the facility; and an abnormality notification unit configured to transmit an abnormality notification to said terminal management server when a detection result by said detection unit exceeds said threshold.

6. The remote monitoring system according to claim 5, wherein said configuration information pieces include contact information to which the information concerning said remote monitoring terminal is reported, and said terminal management server further comprises a report unit configured to report abnormalities in the facility to said contact information in response to said abnormality notification from said remote monitoring terminal.

* * * * *